(12) United States Patent
Sabbatini et al.

(10) Patent No.: US 10,981,422 B2
(45) Date of Patent: Apr. 20, 2021

(54) TIRE NOISE REDUCTION

(71) Applicant: BRIDGESTONE EUROPE NV/SA, Zaventem (BE)

(72) Inventors: Enrico Sabbatini, Rome (IT); Gaetano Fortunato, Rome (IT); Vincenzo Ciaravola, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 0 days.

(21) Appl. No.: 16/840,155

(22) Filed: Apr. 3, 2020

(65) Prior Publication Data

US 2020/0317005 A1 Oct. 8, 2020

(30) Foreign Application Priority Data

Apr. 5, 2019 (EP) ..................................... 19167513

(51) Int. Cl.
*B60C 11/13* (2006.01)
*B60C 11/03* (2006.01)

(52) U.S. Cl.
CPC ...... *B60C 11/1307* (2013.01); *B60C 11/0302* (2013.01); *B60C 11/0304* (2013.01); *B60C 2011/1338* (2013.01); *B60C 2011/1361* (2013.01)

(58) Field of Classification Search
CPC ............. B60C 11/0302; B60C 11/0304; B60C 11/1307; B60C 2011/1338; B60C 2011/1361
See application file for complete search history.

(56) References Cited

U.S. PATENT DOCUMENTS

| D418,785 S | * | 1/2000 | Lovell et al. | D12/147 |
| 6,119,744 A | | 9/2000 | Tsukagoshi | |
| D559,168 S | * | 1/2008 | Murata | D12/523 |
| D603,325 S | * | 11/2009 | Miyazaki | D12/531 |
| 2008/0047644 A1 | | 2/2008 | Yoshikawa et al. | |

FOREIGN PATENT DOCUMENTS

| EP | 0 681 929 A1 | 11/1995 |
| EP | 2 196 332 A1 | 6/2010 |

OTHER PUBLICATIONS

Extended European Search Report and Opinion in EP 19167513.1, dated Jan. 23, 2019, 7 pages.

* cited by examiner

*Primary Examiner* — Steven D Maki
*Assistant Examiner* — Philip N Schwartz
(74) *Attorney, Agent, or Firm* — Foley & Lardner LLP

(57) ABSTRACT

A tire has four circumferential grooves. Grooves are on the vehicle installation inner side of the tire, and on the vehicle installation outer side of the tire. Grooves which are on the vehicle installation inner side each have a plurality of fences in the groove arranged alternately along the groove next to each side wall of the groove. Grooves which are on the vehicle installation outer side do not have fences. The fences increase the path length of sound due to pipe resonance and delay the sound in comparison to grooves on the vehicle installation outer side of the tire. This directs the sound towards the inner side of the tire and reduces the noise on the outer side.

11 Claims, 15 Drawing Sheets

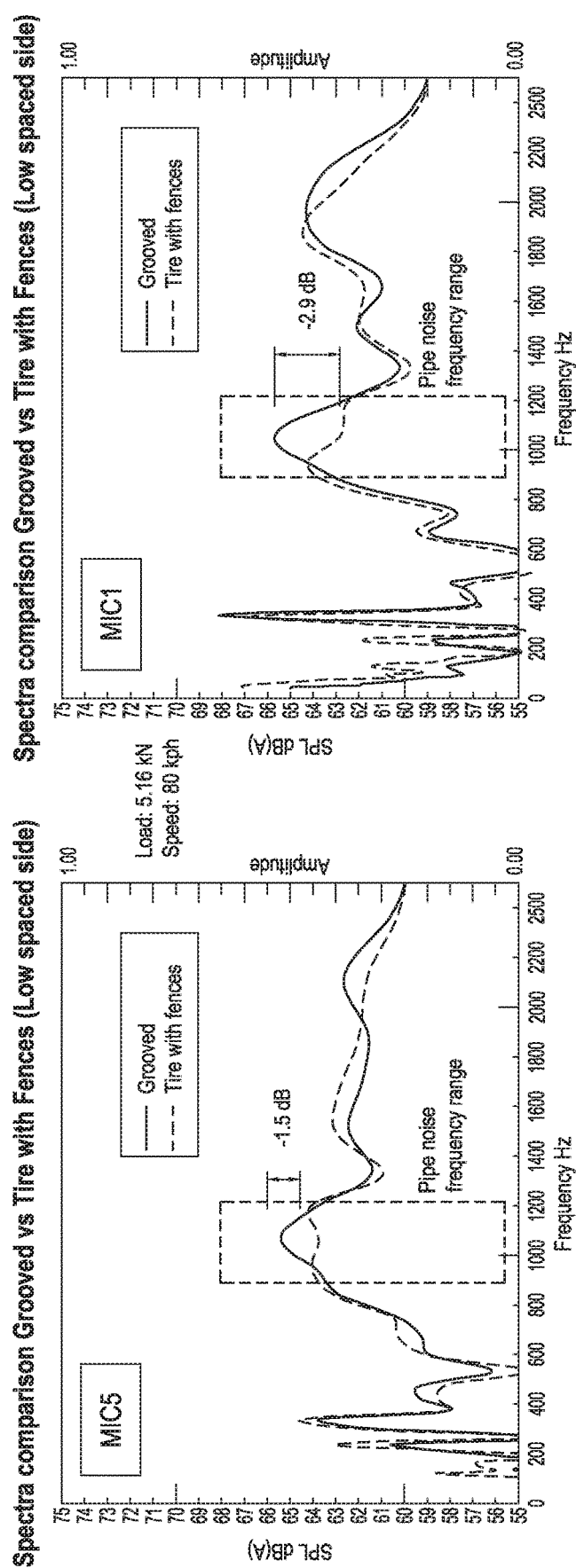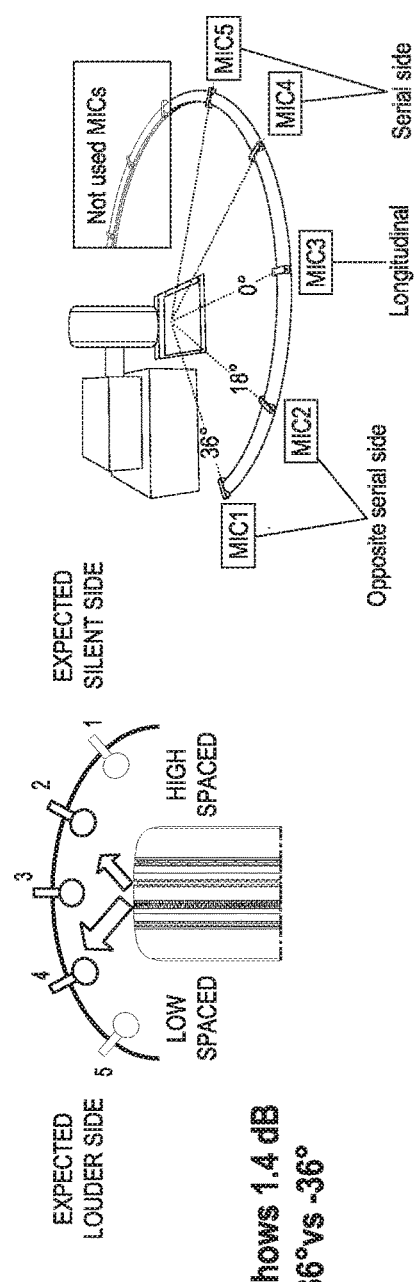
FIG. 8

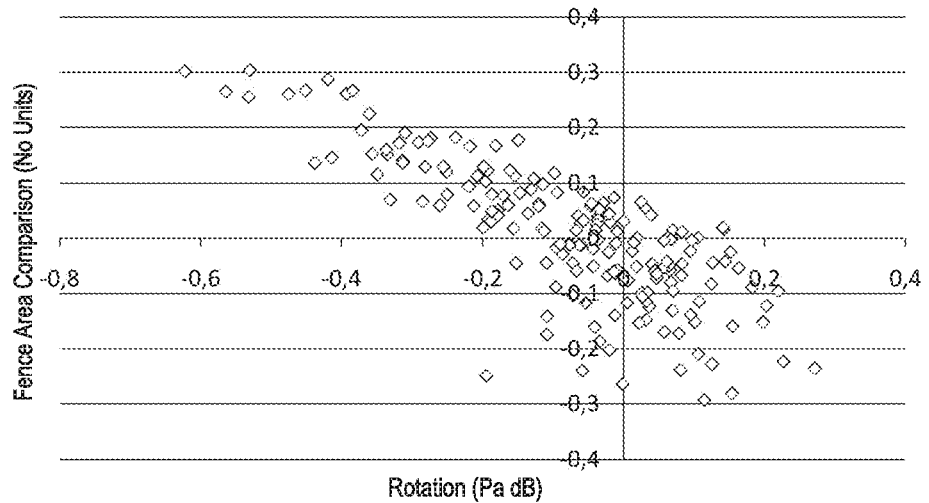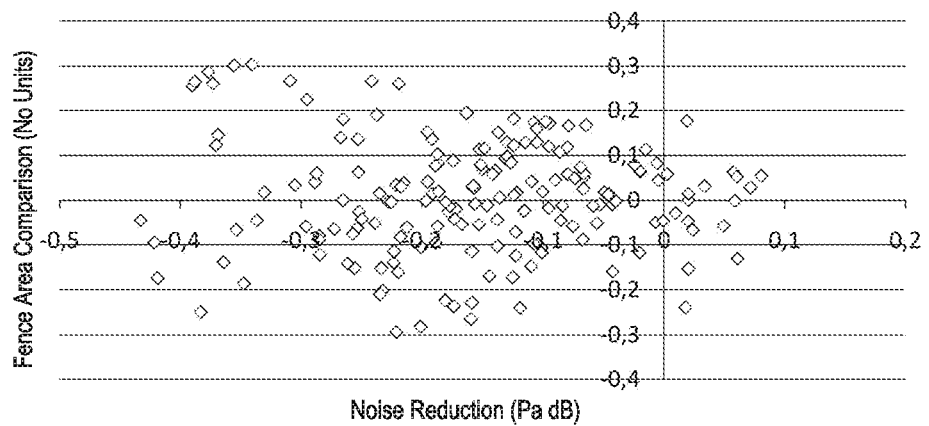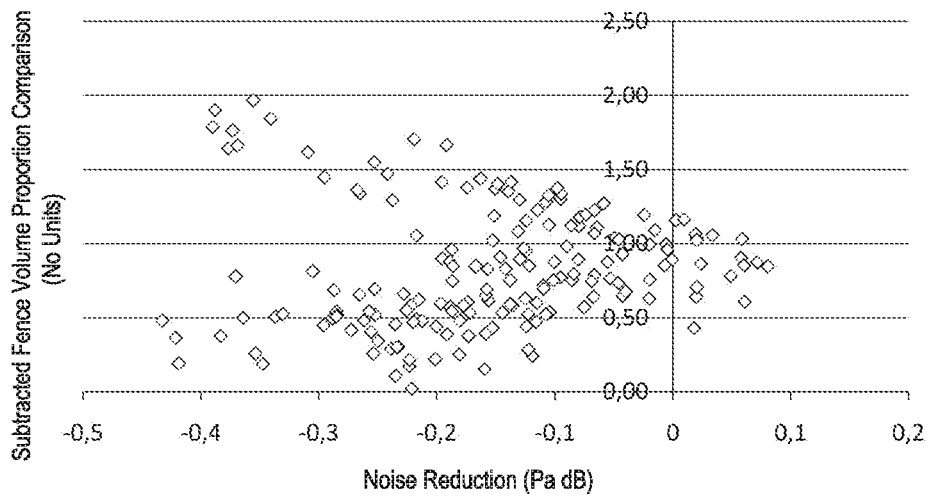
FIG.12

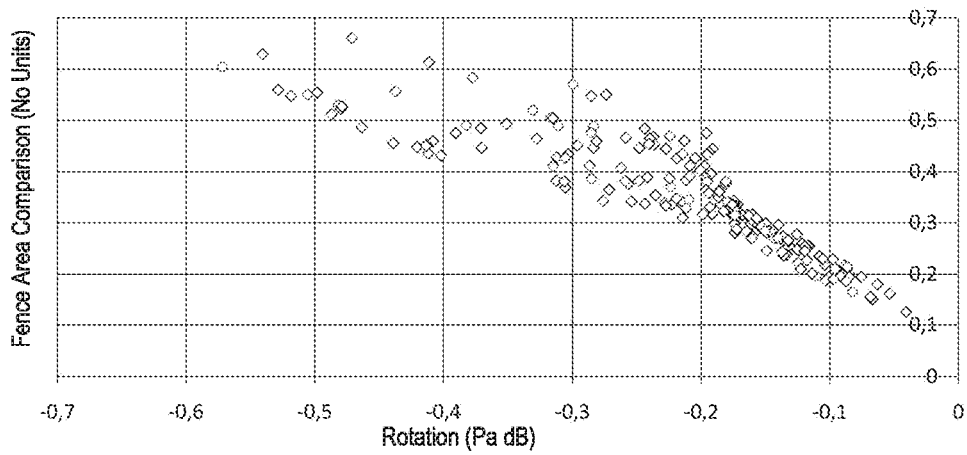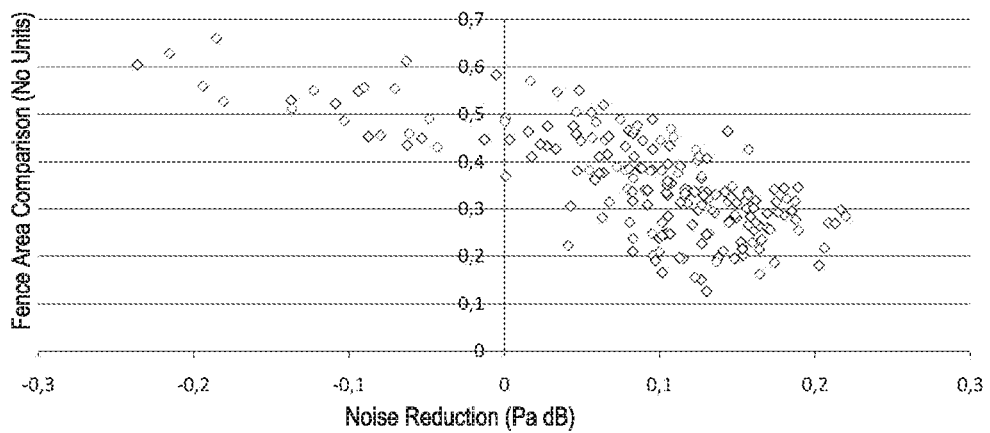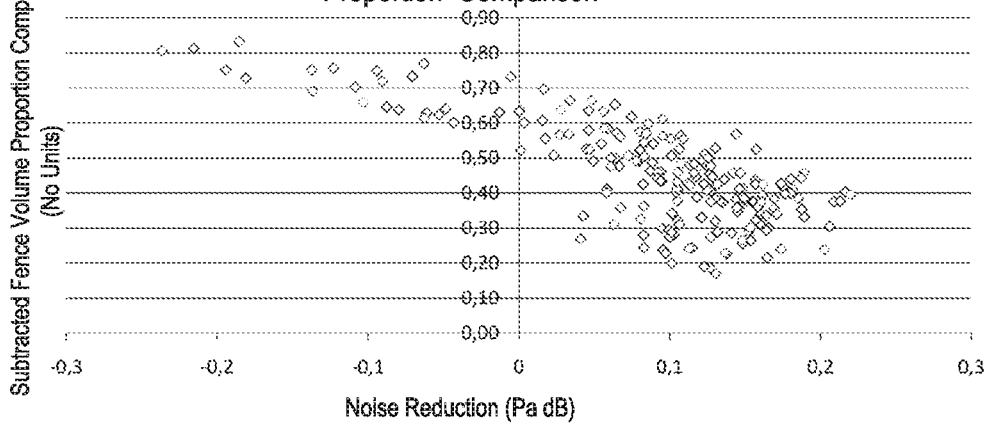
FIG.13

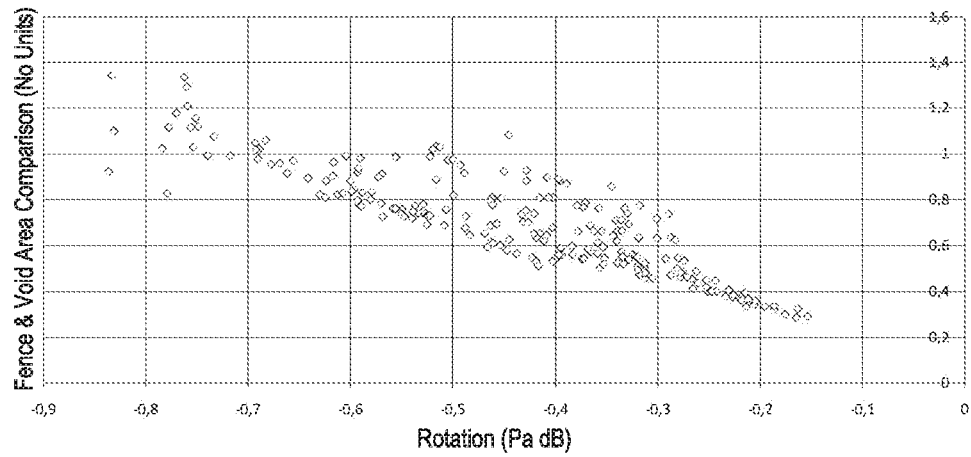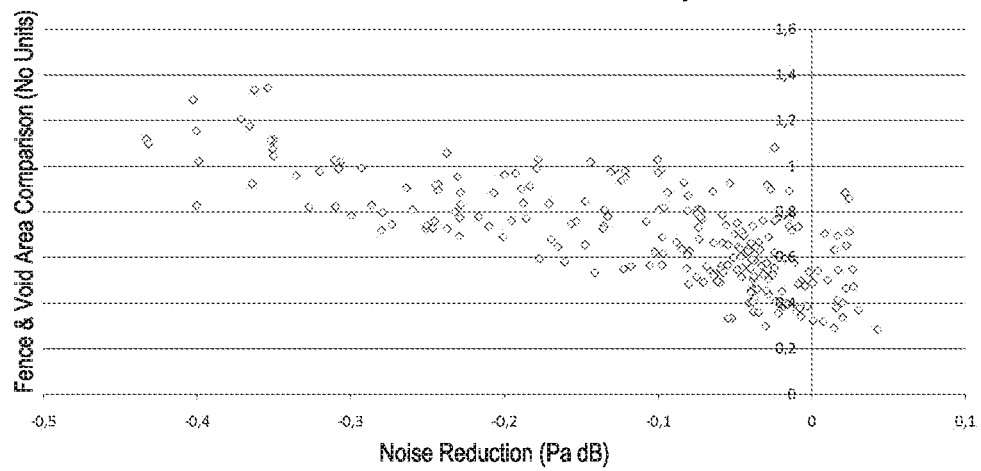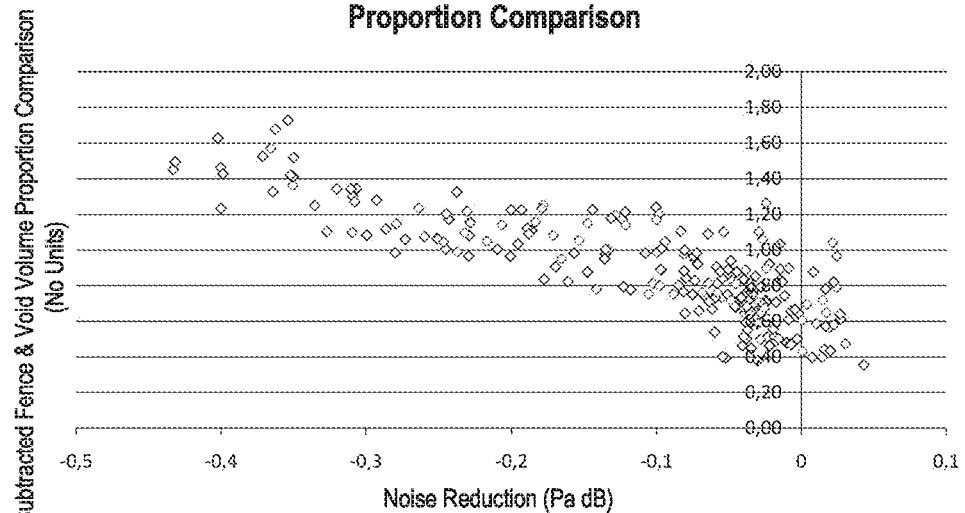
FIG.16

TIRE NOISE REDUCTION

The present application claims priority to European Patent Application No. EP19167513.1 filed Apr. 5, 2019, the contents of which are incorporated herein by reference in their entirety.

The present disclosure relates to tire noise reduction.

Tire noise is a well-recognized problem and the demand for reduced-noise tires has been increasing globally recently due to, for example, EU regulations on tire noise. Tire manufacturers need to ensure that they comply with the regulations and improve the problem of tire noise.

Tire noise is a problem both for the vehicle user, and for people outside the vehicle such as other road users or pedestrians, or people living or working near roads.

There are several sources of tire noise but one of the most important is pipe resonance which results from standing waves which occur in the grooves of the tire tread.

U.S. Pat. No. 6,119,744 discloses a pneumatic tire in which groove fence portions are formed in the circumferential grooves in order to reduce columnar or pipe resonance.

The present disclosure aims to mitigate at least one of the problems of the prior art.

The inventors have discovered that increasing the path length of the sound generated by pipe resonance as it travels along the circumferential groove on one side of the tire more than the other can direct or steer the sound to the side of increased path length. The inventors have found that providing a plurality of protrusions in the groove arranged alternately along the groove next to each side wall of the groove so that the area of the protrusions on one side is greater than the area of the protrusions on the other causes the noise to rotate towards the side with the greater area.

The inventors have found a way of using the principles of acoustic metamaterials to direct sound in tires.

When sound is generated in the groove due to pipe resonance, the protrusions provide a blocking effect for sound travelling down the groove. The protrusions increase the path length that the sound has to travel down the groove. This delays the sound in comparison to a groove without protrusions. By delaying the sound on one side of the tire more than the other, the sound can be directed to the side of the tire with the larger delay.

This provides the advantage over the arrangement of U.S. Pat. No. 6,119,744 that the sound can be directed to one side or the other of the tire as desired.

A first exemplary embodiment provides a tire having a vehicle installation outer side and a vehicle installation inner side, at least two circumferential grooves, and a midpoint which is halfway between the two circumferential grooves which are outermost in the tire width direction,
at least one of the circumferential grooves, which is on the vehicle installation inner side with respect to the midpoint, having a plurality of protrusions in the groove arranged alternately along the groove next to each side wall of the groove,
wherein the following inequality is met:

$$\sum_{k=1}^{n} \frac{Ak}{AGk} - \sum_{l=1}^{m} \frac{Bl}{BGl} > 0$$

where:
k denotes a groove on the vehicle installation inner side with respect to the midpoint;
n is the number of grooves on the vehicle installation inner side with respect to the midpoint;
l denotes a groove on the vehicle installation outer side with respect to the midpoint;
m is the number of grooves on the on the vehicle installation outer side with respect to the midpoint;
Ak and Bl is the area of the protrusion when the groove is viewed in cross-section perpendicular to the longitudinal direction of the groove; and
AGk and BGl is the total area of the groove when the groove is viewed in cross-section perpendicular to the longitudinal direction of the groove.

The tire has a vehicle installation inner side and a vehicle installation outer side and is therefore designed to be installed with one particular side facing the vehicle and the other side facing away from the vehicle. Tires of this type are well known and may have, for example, asymmetric tread patterns or other asymmetric features.

In the following, "rotation" indicates the change in noise levels on the vehicle installation inner and outer sides of the tire. That is to say, where, as a result of the features recited herein, the noise level on the outer side is reduced more than the noise level on the inner side, the rotation is said to be inwards (and negative). On the other hand, where the noise level on the inner side is reduced more than the noise level on the outer side, the rotation is said to be outwards (and positive).

In the following, "overall noise reduction" indicates the change in noise levels at the centre of the tire and on the quieter side of the tire (which is the opposite side from the direction of rotation). Therefore, when the rotation is inwards, the outer side will be the quieter side. The overall noise reduction is the change in noise level on the outer side added to the change in noise level at the centre of the tire. If the result is positive, the overall noise level has increased. If the result is negative, the overall noise level has reduced.

The protrusions are provided in order to increase the path length of the sound generated by pipe resonance as it travels along the circumferential groove. The increase in path length leads to a time delay. By increasing the path length more on one side the tire, the sound can be steered towards that side. The sound encounters the first protrusion and is diverted towards the opposite sidewall. It then encounters the second protrusion and is diverted back again towards the first sidewall. The sound then travels through the space between the first and second protrusions.

The inequality:

$$\sum_{k=1}^{n} \frac{Ak}{AGk} - \sum_{l=1}^{m} \frac{Bl}{BGl} > 0$$

gives a comparison of the protrusion areas between the vehicle installation inner and outer sides. There has been found to be a correlation between the protrusion area comparison result and the rotation, and specifically the larger the result of the comparison, the more rotation inwards. When the rotation is inwards, the noise level on the outer side (known as "pass-by noise") is reduced.

In calculating Ak, Bl, AGk and BGl, any desired units of length can be used because the units cancel out.

If a particular groove has no protrusions then Ak or Bl will be zero for that groove. If all the grooves on the vehicle installation outer side with respect to the midpoint have no protrusions, then the term:

$$\sum_{l=1}^{m} \frac{Bl}{BGl}$$

will be zero.

Preferably, in at least one of the circumferential grooves, the protrusion next to one side wall does not overlap with the protrusion arranged alternately next to the other side wall of the groove. More preferably, the protrusion next to one side wall is spaced apart in the longitudinal direction of the groove from the adjacent protrusion arranged alternately next to the other side wall of the groove. By arranging the protrusions in these ways, the path length of the sound can be increased while the water capacity of the groove can be increased leading to improved drainage.

Preferably, in at least one of the circumferential grooves, adjacent protrusions next to one side wall are spaced from each other. More preferably, adjacent protrusions next to both side walls are spaced from each other. By arranging the protrusions in these ways, the path length of the sound can be increased while the water capacity of the groove can be increased leading to improved drainage.

In one preferred form, each protrusion causes the sound to travel in a direction substantially perpendicular to the side wall of the groove.

AGk and BGl is the area between the groove walls. Also, the cross-section is taken at the point in the longitudinal direction of the groove where the protrusion is provided.

Preferably, the protrusions protrude from each side wall of the groove toward the centre of the groove. Preferably, the protrusions also protrude from the groove bottom.

Preferably, the following inequality is met:

$$\sum_{k=1}^{n} \frac{Ak}{AGk} - \sum_{l=1}^{m} \frac{Bl}{BGl} > 0.05$$

In simulations (called hereafter "first simulations") of a tire with two grooves with fences on the inner side and two grooves with fences on the outer side, all simulations with a comparison result of >0.05 were found to give a rotation inwards. All simulations were carried out using COMSOL® and MATLAB® software.

There was also found to be a correlation between rotation and overall noise reduction. In particular, the larger the rotation, the larger the overall noise reduction. But the simulations showed that for small rotations (less than −0.1 dB), the overall noise reduction was positive (i.e. the overall noise actually increased). However, as the rotation increased, the overall noise level reduced, and above a certain rotation (−0.35 dB), all simulations showed an overall noise reduction.

Accordingly, in order to provide a minimum level of rotation, it is more preferable that the comparison result is >0.15, more preferably >0.35. In simulations of a tire with two grooves with protrusions on the inner side and two grooves with protrusions on the outer side, all simulations with a comparison result of >0.35 were found to give sufficient rotation inwards for an overall noise reduction as well. This is because, as described above, there was found to be a correlation between rotation and overall noise reduction, and with a comparison result of above 0.35 it was found that there was sufficient rotation inwards for an overall noise reduction as well. In these simulations, the each groove had the same width.

For example, in the simulations, when the comparison gives values of 0.43, 0.39 and 0.36, overall noise reductions of −0.03 dB, −0.10 dB and −0.10 dB have been obtained, respectively, which correspond to rotations of −0.29 dB, −0.40 dB and −0.36 dB, respectively.

On the other hand, in other simulations (called hereafter "second simulations") of a tire with two grooves with fences on the inner side and two grooves with fences on the outer side, all simulations with a comparison result of >0.20 were found to give sufficient rotation inwards for an overall noise reduction as well. Therefore, it is preferable that the comparison result is >0.20. In these simulations, the two grooves next to the midpoint were wider than the other two grooves.

Alternatively, this comparison result may be >0.10, >0.25, >0.30 or >0.40.

It should be noted, as described above, that negative values of rotation indicate a rotation inwards, and positive values indicate a rotation outwards. Negative values of overall noise reduction indicate an overall noise reduction, and positive values of overall noise reduction indicate an overall noise increase.

Preferably, protrusion density, which is the number protrusions in a certain length of groove, is also taken into account. In this regard, it is preferable that the following inequality is met:

$$\sum_{k=1}^{n} Ek \frac{Ak}{AGk} - \sum_{l=1}^{m} Fl \frac{Bl}{BGl} > 1.20$$

where:
Ek and Fl is the protrusion density ratio, the protrusion density being the number of protrusions in a certain length of groove, and the protrusion density ratio being the ratio of the protrusion density in the groove to the protrusion density in the groove with the lowest protrusion density. For example, if the protrusion density in the groove in question is 40 protrusions per 100 mm and the protrusion density in the groove with the lowest protrusion density is 8 protrusions per 100 mm, the ratio will be 40/8=5.

This inequality gives a protrusion volume comparison between the inner and outer sides. In the first simulations, all simulations with a comparison result of >1.90 gave overall noise reduction as well as rotation, and this comparison result is therefore preferable. For example, when the comparison gives values of 2.31, 2.11 and 1.96, overall noise reductions of −0.1 dB, −0.03 dB and −0.11 dB have been obtained, respectively. These correspond to rotations of −0.40 dB, −0.29 dB and −0.37 dB, respectively.

However, in the second simulations, all simulations with a comparison result of >1.20 gave overall noise reduction as well as rotation.

More preferably, this comparison result is >1.5, more preferably still >2.0.

In one preferable form, at least two of the circumferential grooves, which are on the vehicle installation inner side with respect to the midpoint, each have a plurality of protrusions in the groove arranged alternately along the groove next to each side wall of the groove.

Providing more protrusions in the grooves on the vehicle installation inner side gives better rotation inwards.

Preferably, at least one of the circumferential grooves does not have the protrusions, preferably on the vehicle installation outer side with respect to the midpoint. Preferably, two of the circumferential grooves do not have the protrusions, preferably on the vehicle installation outer side with respect to the midpoint. This ensures good water drainage.

In one preferable form, two of the circumferential grooves, which are on the vehicle installation inner side with respect to the midpoint, each have a plurality of protrusions in the groove arranged alternately along the groove next to each side wall of the groove, and two of the circumferential grooves, which are on the vehicle installation outer side with respect to the midpoint, do not have the protrusions.

This provides a good balance of rotation inwards (i.e. pass-by noise reduction) and water drainage. There may be a total of four circumferential grooves.

Preferably, for any of the circumferential grooves, which is on the vehicle installation inner side with respect to the midpoint, the following inequality is met:

$$\frac{Ak}{AGk} > 0.2$$

With the protrusions in a groove on the vehicle installation inner side being more than 20% of the total groove area, a good delaying effect can be achieved. Preferably, the ratio is >0.3, more preferably >0.4. The ratio may also be >0.5 or >0.6.

Preferably, for any of the circumferential grooves, which is on the vehicle installation inner side with respect to the midpoint, the following inequality is met:

$$\frac{Ak}{AGk} < 0.7$$

With the protrusions in a groove on the vehicle installation inner side being less than 70% of the total groove area, some water drainage can be achieved. Preferably, the ratio is <0.6, more preferably <0.5. The ratio may also be <0.4 or <0.3.

The above is equally applicable to the protrusions in a groove on the vehicle installation outer side.

Preferably, at least one, more preferably each, of the circumferential grooves is substantially parallel to circumferential direction.

It is preferable that the at least one of the circumferential grooves which is on the vehicle installation inner side with respect to the midpoint and which has the protrusions is substantially parallel to the tire circumferential direction.

Preferably, the side walls of at least one, more preferably each, of the circumferential grooves are substantially parallel. That is, in a groove, one groove wall is substantially parallel to the other.

Preferably, the portion of a side wall extending between two adjacent protrusions is substantially parallel to the tire circumferential direction.

Preferably, at least one of the side walls of at least one of the circumferential grooves is straight when viewed in the tire radial direction, and preferably extends along the tire circumferential direction.

A second exemplary embodiment provides a tire having a vehicle installation outer side and a vehicle installation inner side, at least two circumferential grooves, and a midpoint which is halfway between the two circumferential grooves which are outermost in the tire width direction, at least one of the circumferential grooves, which is on the vehicle installation inner side with respect to the midpoint, having a plurality of protrusions in the groove arranged alternately along the groove next to each side wall of the groove, and having a plurality of recesses, each recess being provided in a side wall of the groove opposite to a different protrusion, wherein the following inequality is met:

$$\sum_{k=1}^{n} \frac{Ak}{AGk} + \frac{Ck}{CGk} - \sum_{l=1}^{m} \frac{Bl}{BGl} + \frac{Dl}{DGl} > 0$$

where:
k denotes a groove on the vehicle installation inner side with respect to the midpoint;
n is the number of grooves on the vehicle installation inner side with respect to the midpoint;
l denotes a groove on the vehicle installation outer side with respect to the midpoint;
m is the number of grooves on the on the vehicle installation outer side with respect to the midpoint;
Ak and Bl is the area of the protrusion when the groove is viewed in cross-section perpendicular to the longitudinal direction of the groove;
AGk and BGl is the total area of the groove when the groove is viewed in cross-section perpendicular to the longitudinal direction of the groove;
Ck and Dl is the area of the recess when the groove is viewed in cross-section perpendicular to the longitudinal direction of the groove; and
CGk and DGl is the total area of the groove when the groove is viewed in cross-section perpendicular to the longitudinal direction of the groove.

Providing these recesses has been found to improve the delaying of noise in the groove. The recesses provide additional path length for the noise traveling along the groove, which provides an additional delay.

The combination of protrusions and recesses has been found to provide a good level of overall noise reduction in comparison to just protrusions. Also, the recesses, unlike the protrusions, have the advantage that they do not decrease the volume of the groove available for water drainage.

If a particular groove has no protrusions then Ak or Bl will be zero for that groove. If a particular groove has no recesses then Ck or Dl will be zero for that groove. If all the grooves on the vehicle installation outer side with respect to the midpoint have no protrusions or recesses, then the term:

$$\sum_{l=1}^{m} \frac{Bl}{BGl} + \frac{Dl}{DGl}$$

will be zero.

Preferably, each recess is provided in a side wall in the same position in the groove longitudinal direction as the protrusion to which the recess is opposite.

Preferably, the recesses are arranged alternately along the groove.

Preferably, in order to provide sufficient rotation for overall noise reduction, the following inequality is met:

$$\sum_{k=1}^{n} \frac{Ak}{AGk} + \frac{Ck}{CGk} - \sum_{l=1}^{m} \frac{Bl}{BGl} + \frac{Dl}{DGl} > 0.90$$

This was found to be the case in simulations (referred to hereafter as "third simulations") with two grooves with protrusions and recesses on the inner side and two grooves on the outer side with neither protrusions nor recesses.

Alternatively, the comparison result may be >0.30, >0.50, >0.70, >1.0, >1.10, >1.20 or >1.30.

Preferably, in order to provide sufficient rotation for overall noise reduction, the following inequality is met:

$$\sum_{k=1}^{n} Ek \frac{Ak}{AGk} + Gk \frac{Ck}{CGk} - \sum_{l=1}^{m} Fl \frac{Bl}{BGl} + Hl \frac{Dl}{DGl} > 1.1$$

where:
- Ek and Fl is the protrusion density ratio, the protrusion density being the number of protrusions in a certain length of groove, and the protrusion density ratio being the ratio of the protrusion density in the groove to the protrusion density in the groove with the lowest protrusion density; and
- Gk and Hl is the recess density ratio, the recess density being the number of recesses in a certain length of groove, and the recess density ratio being the ratio of the recess density in the groove to the recess density in the groove with the lowest recess density.

For example, if the protrusion density in the groove in question is 40 protrusions per 100 mm and the protrusion density in the groove with the lowest protrusion density is 8 protrusions per 100 mm, the ratio will be 40/8=5. The recess density ratio would be calculated in an analogous way.

More preferably, this comparison result is >1.2, more preferably still, >1.3, more preferably still, >1.4, more preferably still, >1.5.

The third simulations found this to give overall noise reduction.

Preferably, at least two of the circumferential grooves, which are on the vehicle installation inner side with respect to the midpoint, each have a plurality of protrusions in the groove arranged alternately along the groove next to each side wall of the groove, and a plurality of recesses, each recess being provided in a side wall of the groove opposite to a different protrusion.

Preferably, at least one of the circumferential grooves does not have the protrusions or recesses, preferably on the vehicle installation outer side with respect to the midpoint. Preferably, two of the circumferential grooves do not have the protrusions or recesses, preferably on the vehicle installation outer side with respect to the midpoint. This ensures good water drainage.

In one preferred form, two of the circumferential grooves, which are on the vehicle installation inner side with respect to the midpoint, each have a plurality of protrusions in the groove arranged alternately along the groove next to each side wall of the groove, and a plurality of recesses, each recess being provided in a side wall of the groove opposite to a different protrusion, and two of the circumferential grooves, which are on the vehicle installation outer side with respect to the midpoint, do not have the protrusions or recesses. Where there are neither protrusions nor recesses in the two circumferential grooves on the outer side, water drainage in those grooves can be ensured and noise steering can be obtained without needing to modify those grooves.

Preferably, for any of the circumferential grooves, which is on the vehicle installation inner side with respect to the midpoint, the following inequality is met:

$$\frac{Ak}{AGk} > 0.2$$

and/or the following inequality is met:

$$\frac{Ck}{CGk} > 0.2$$

With the protrusions or recesses in a groove on the vehicle installation inner side being more than 20% of the total groove area, a good delaying effect can be achieved. Preferably, the ratio is >0.3, more preferably >0.4. The ratio may also be >0.5 or >0.6.

The area of the protrusions in one circumferential groove may be different from the area of the protrusions in another circumferential groove, the area of the protrusion being when the groove is viewed in cross-section perpendicular to the longitudinal direction of the groove.

The protrusion density in one circumferential groove may be different from the protrusion density in another circumferential groove, the protrusion density being the number protrusions in a certain length of groove.

Preferably, in at least one of the circumferential grooves, at least one of the protrusions is equally spaced from its two adjacent protrusions. Preferably, in at least one of the circumferential grooves, the plurality of protrusions have equal spacing, preferably all around circumference of the tire.

The protrusions and/or the recesses are preferably rectangular or square when viewed along the circumferential groove.

The protrusions preferably protrude at a right angle from the groove wall when viewed in the tire radial direction. The recesses are preferably recessed at a right angle from the groove wall when viewed in the tire radial direction.

Preferably, the recesses are provided at the groove bottom.

The protrusions preferably have walls which protrude at a right angle from the groove wall when viewed in the tire radial direction. The recesses preferably have walls which are recessed at a right angle from the groove wall when viewed in the tire radial direction.

Preferably, the protrusions turn the sound through at least 90 degrees when viewed in the tire radial direction.

The protrusions preferably extend from the side walls to the extent that they overlap in the groove width direction. Alternatively, they may extend so that they do not overlap.

The protrusions are preferably provided on an insert which is inserted into the circumferential groove. The insert may be made of an elastomeric material and may be fixed in the groove by an adhesive. The insert may be made by 3D printing.

The protrusion density in respective grooves preferably increases in the direction vehicle installation outer side to vehicle installation inner side.

Preferably, in at least one of the circumferential grooves, at least one of the recesses is equally spaced from its two adjacent recesses or protrusions. Preferably, in at least one of the circumferential grooves, the plurality of recesses have equal spacing, preferably all around circumference of the tire.

Preferably, the protrusions are fences. Preferably, each protrusion protrudes abruptly.

Preferably, each recess is recessed abruptly into the side wall.

Preferably, if the first or second aspects, no recesses and/or protrusions are provided in the circumferential grooves on the vehicle installation outer side with respect to the midpoint.

Preferably, each recess, more preferably the centre of each recess in the groove longitudinal direction, is provided at the same position in the groove longitudinal direction as its opposite protrusion, more preferably the centre of the protrusion in the groove longitudinal direction. This arrangement was found to give the best rotation and overall noise reduction.

The preferred features of the first exemplary embodiment are equally applicable to the second exemplary embodiment, and vice versa.

In a third exemplary embodiment, a tire having a vehicle installation outer side and a vehicle installation inner side, at least two circumferential grooves, and a midpoint which is halfway between the two circumferential grooves which are outermost in the tire width direction, at least one of the circumferential grooves, which is on the vehicle installation inner side with respect to the midpoint, having a plurality of protrusions in the groove arranged alternately along the groove next to each side wall of the groove, wherein the following inequality is met:

$$\sum_{k=1}^{n} Ek \frac{Ak}{AGk} - \sum_{l=1}^{m} Fl \frac{Bl}{BGl} > 1.0$$

where:

Ek and Fl is the protrusion density ratio, the protrusion density being the number of protrusions in a certain length of groove, and the protrusion density ratio being the ratio of the protrusion density in the groove to the protrusion density in the groove with the lowest protrusion density. For example, if the protrusion density in the groove in question is 40 protrusions per 100 mm and the protrusion density in the groove with the lowest protrusion density is 8 protrusions per 100 mm, the ratio will be 40/8=5.

This inequality gives a protrusion volume comparison between the inner and outer sides.

Preferably, the comparison result is >1.15. In the first simulations, all simulations with a comparison result of >1.15 were found to give a rotation inwards. More preferably, the comparison result is >1.25, more preferably >1.5, more preferably >2.

The preferred features of the first exemplary embodiment are equally applicable to the third exemplary embodiment, and vice versa.

Preferred embodiments of the present disclosure will now be described, purely as examples, with reference to the drawings in which:

FIG. 8 is, on the left, a front view of the tire of FIG. 7, and, on the right, a perspective view of the tire of FIG. 7, both showing the positions of microphones, and graphs showing the sound pressures detected by two of the microphones;

FIG. 12 is graphs for tires with four out of four circumferential grooves with fences where different grooves have different widths;

FIG. 13 is graphs for tires with only two out of four grooves with fences;

FIG. 16 is graphs for tires with only two out of four grooves with fences and voids.

Figure 1:
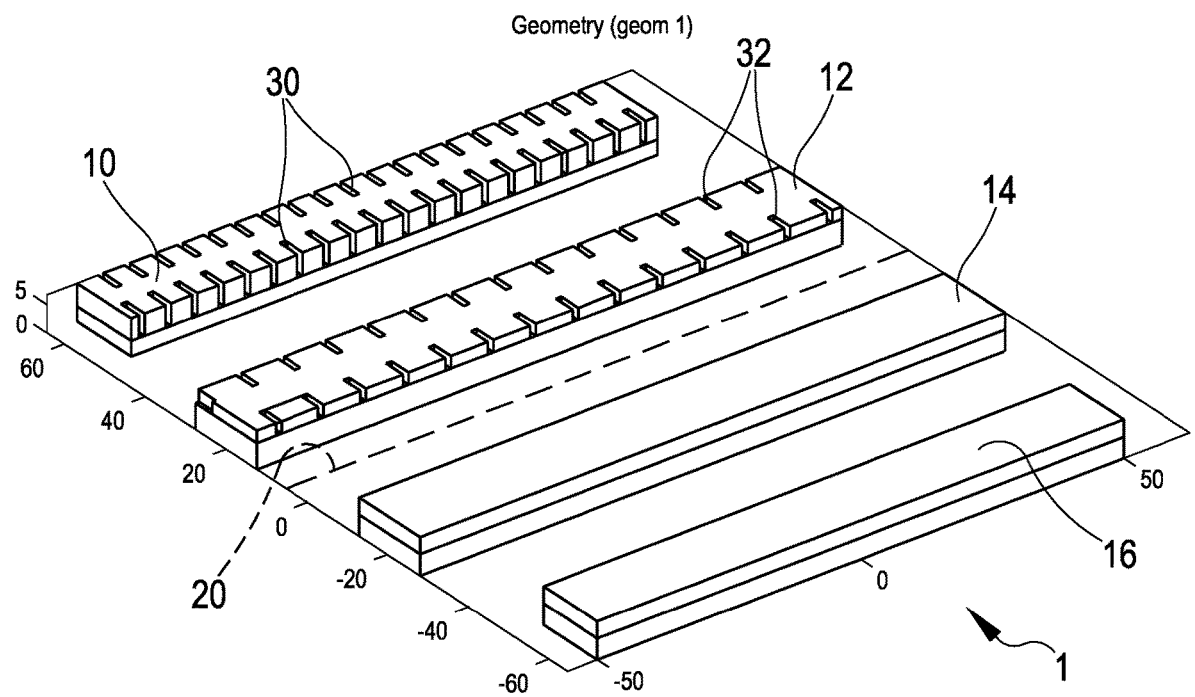
FIG. 1 is a schematic perspective view of four circumferential grooves showing the fence distribution of a tire according to a first embodiment.

Referring to FIG. 1, four grooves 10, 12, 14 and 16 are shown, which represent the circumferential grooves of a tire 1 of the first embodiment. It should be noted that the grey bars in FIG. 1 show the grooves and not ribs. In the present embodiment, the grooves 10, 12, 14 and 16 are parallel. Grooves 10 and 12 are on the vehicle installation inner side of the tire 1, and grooves 14 and 16 are on the vehicle installation outer side of the tire 1. In the present embodiment, the grooves 10, 12, 14 and 16 are equidistant from each other. A midpoint which is halfway between the two circumferential grooves 10 and 16 which are outermost in the tire width direction is shown by dashed line 20.

In the present embodiment, two of the grooves (namely, grooves 10 and 12) which are on the vehicle installation inner side with respect to the midpoint each have a plurality of protrusions in the form of fences 30, 32 in the groove 10, 12 arranged alternately along the groove 10, 12 next to each side wall of the groove 10, 12. Grooves 14 and 16 do not have fences. The fences 30, 32 increase the path length of sound due to pipe resonance and delay the sound in comparison to grooves 14 and 16. This directs the sound towards the inner side of the tire 1 and reduces the noise on the outer side.

Figure 2:
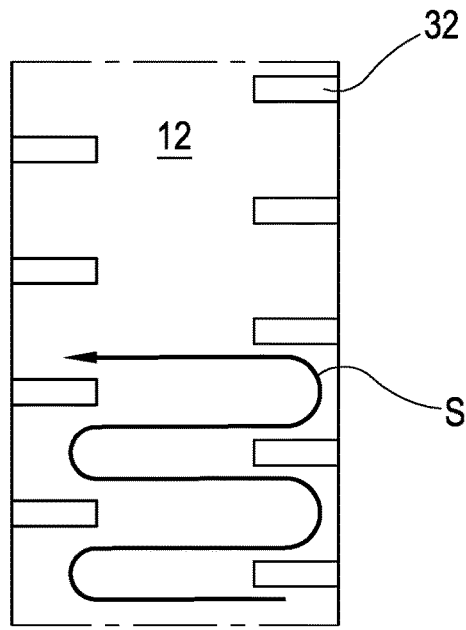
FIG. 2 is an enlarged fragmentary plan view of one circumferential groove of the embodiment of FIG. 1.

FIG. 2 shows an enlarged fragmentary view of the embodiment of FIG. 1, and in particular the groove 12. FIG. 2 shows the path of sound S as it travels along the groove 12. The sound S follows a sinuous path. When the sound, travelling in the groove longitudinal direction, encounters a fence 32 it is diverted towards the opposite side of the groove 12. It travels backwards and forwards in this way as it travels down the groove 12. Thus the path length is longer than had the sound simply traveled straight along the groove longitudinal direction.

In the present embodiment, the fence density, which is the number fences in a certain length of groove, is larger in groove 10 than in groove 12. However, this is not essential.

The fence density ratio in groove 12 is 25/25=1. The fence density ratio in groove 10 is 39/25=1.6. Here, 25 and 39 are the number of fences per 100 mm.

In the present embodiment, fences 30 in groove 10 are each 4 mm in height and 4.5 mm in length (measured in the groove width direction) giving a fence area of 18 mm². Fences 32 in groove 12 are each 2.2 mm in height and 3.8 mm in length giving a fence area of 8.4 mm². The thickness is 1 mm (measured in the groove longitudinal direction).

The grooves 10 and 12 are each 5 mm in height and 10 mm in width giving a total area of 50 mm².

When the following inequality is met, the noise will be rotated inwards:

$$\sum_{k=1}^{n} \frac{Ak}{AGk} - \sum_{l=1}^{m} \frac{Bl}{BGl} > 0$$

where:
k denotes a groove on the vehicle installation inner side with respect to the midpoint;
n is the number of grooves on the vehicle installation inner side with respect to the midpoint;
l denotes a groove on the vehicle installation outer side with respect to the midpoint;
m is the number of grooves on the on the vehicle installation outer side with respect to the midpoint;
Ak and Bl is the area of the protrusion (and optionally the area of the void) when the groove is viewed in cross-section perpendicular to the longitudinal direction of the groove; and
AGk and BGl is the total area of the groove when the groove is viewed in cross-section perpendicular to the longitudinal direction of the groove.

In the present embodiment, the term:

$$\sum_{k=1}^{n} \frac{Ak}{AGk}$$

is calculated for grooves 10 and 12 as 18/50+8.4/50=0.53.

In the present embodiment, the term:

$$\sum_{l=1}^{m} \frac{Bl}{BGl}$$

is calculated as for grooves 14 and 16 and is calculated as 0/50+0/50=0.

Therefore, the comparison is 0.53−0=0.53. This is greater than 0 as required for rotation inwards. Simulations of the present embodiment gave a rotation of −0.48 dB and an overall noise reduction of −0.18.

Figure 3:
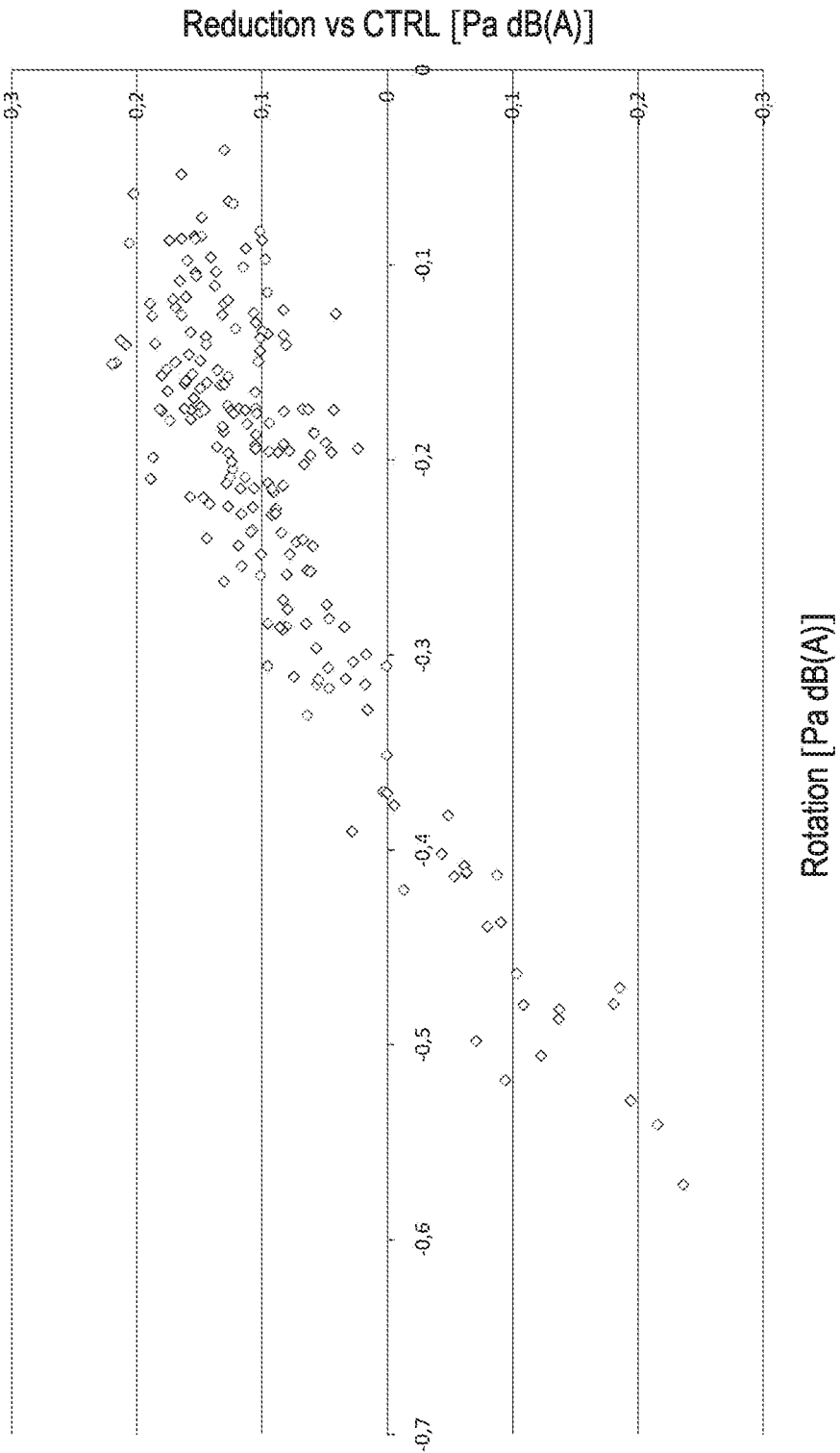
FIG. 3 is a graph of overall noise reduction vs rotation for tires with only two out of four circumferential grooves with fences.

FIG. 3 is a graph of the results of simulations with the configuration shown in FIG. 1 but with the height and width of the fences varied. The fence densities were not varied. It can be seen that all data points show a negative rotation because the fences are only provided on the vehicle installation inner side. Some data points also show an overall noise increase rather than reduction, with a trend for larger rotations to give larger noise reductions.

It can be seen that for rotations less than −0.3 dB, the overall noise reduction is positive (i.e. the overall noise actually increases). However, as the rotation increases, the overall noise level is reduced, and above a certain rotation (−0.4 dB), all simulations showed an overall noise reduction.

Figure 4:
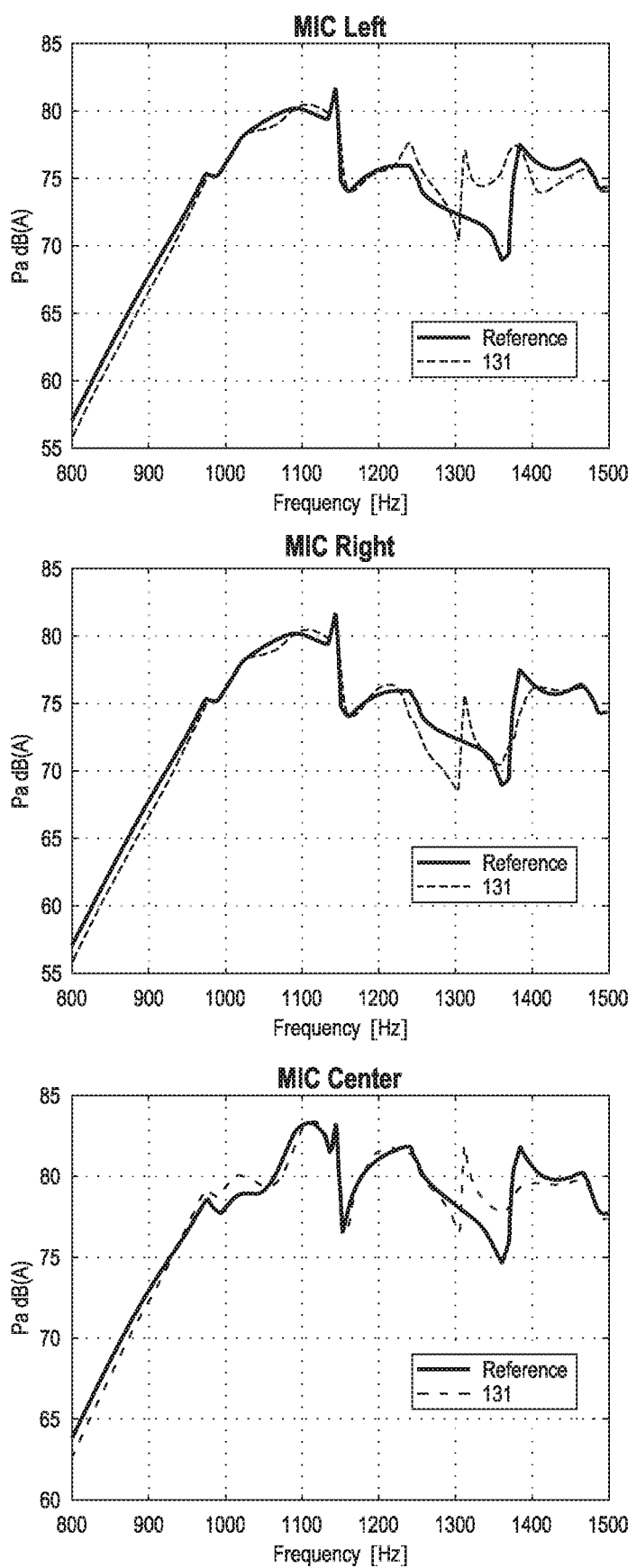
FIG. 4 is three graphs showing the sound pressures detected by three microphones positioned around a tire.

FIG. 4 shows the simulated microphone outputs for a microphone on the left (inner) side, the right (outer) side and the centre of the tire 1. The line labelled "131" is output for the configuration of grooves according to FIG. 1 as described above. The line labelled "Reference" is for a tire without any protrusions in grooves 10, 12, 14 and 16.

Pipe resonance occurs in the frequency range 900-1200 Hz. The outputs are integrated over this range. Then, for the left microphone, the reference output (which has no fences) is subtracted from the result for the configuration with the fences, and the same is done for the right microphone. Typically, the results of the subtractions will be negative. The result for the left microphone is then subtracted from the result for the right, to give the rotation. For example, if the result for the left is −1.5 dB and for the right is −2.9 dB: −2.9−−1.5=−1.4 dB rotation. For the results shown in FIG. 3, since all the protrusions are on the left (inner) side of the tire 1, all the rotations are negative.

The overall noise reduction is then calculated. As the rotations are all negative, the calculation only involves the centre and right microphone outputs. Specifically, for the centre microphone, the reference output (which has no fences) is subtracted from the result for the configuration with the fences. This is then added to the subtraction result done earlier for the right microphone. The result gives the overall noise reduction. This can be summarised as follows:

Rotation:
(Output right—reference output right)—(output left—reference output left).

Overall noise reduction:
If rotation negative: (output centre—reference output centre)+(output right—reference output right)
If rotation positive: (output centre—reference output centre)+(output left—reference output left)

Figure 5:
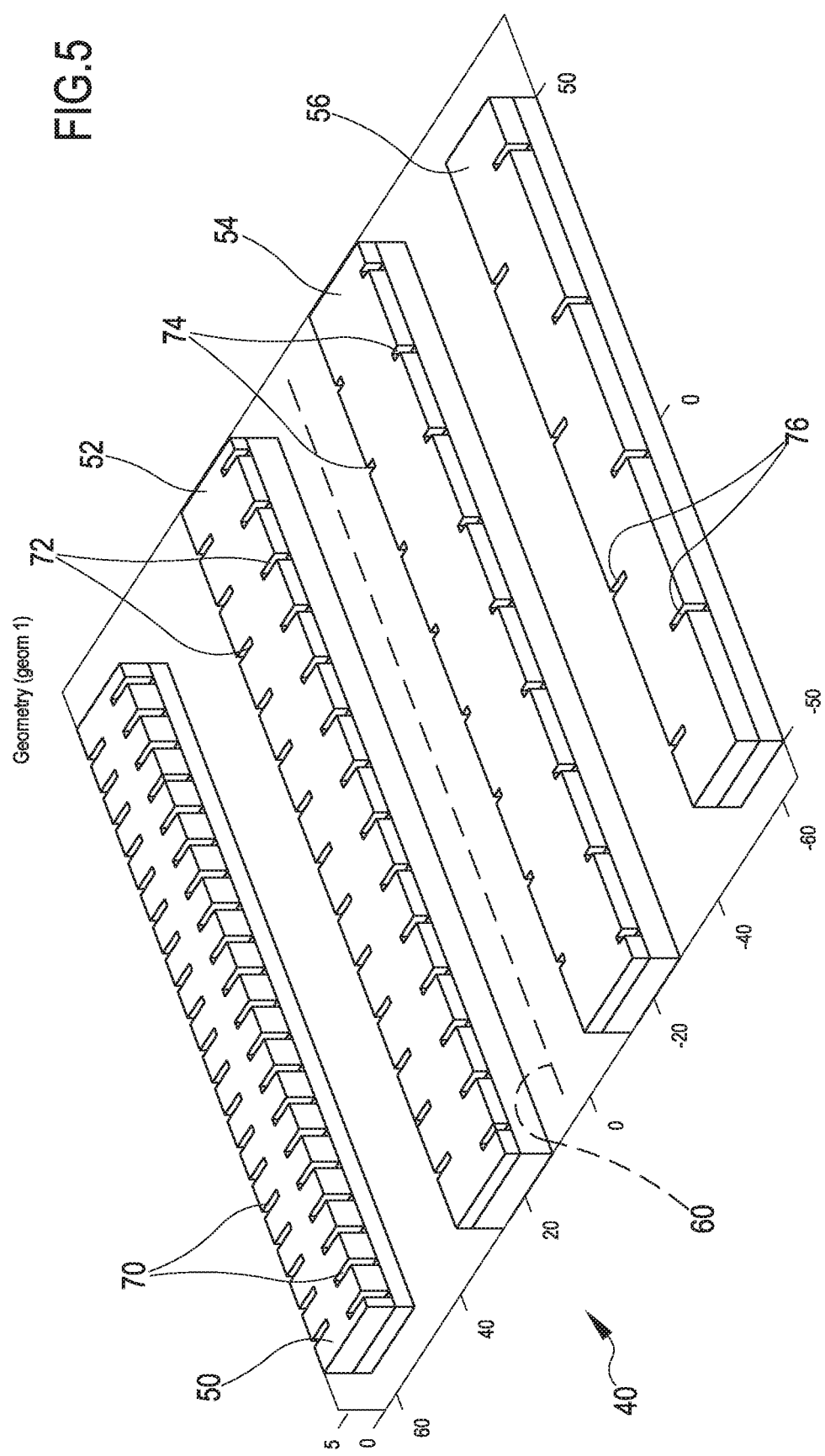
FIG. 5 is a schematic perspective view of four circumferential grooves showing the fence distribution of a tire according to a second embodiment.

FIG. 5 shows configuration of grooves of a tire 40 of a second embodiment. The configuration is similar to that of FIG. 1 and the first embodiment except that all the grooves have fences. In detail, the grooves 50, 52, 54 and 56 are the same as grooves 10, 12, 14 and 16 of FIG. 1 except that grooves 54 and 56 have fences 74 and 76 whereas grooves 14 and 16 do not. The midpoint is shown by dashed line 60.

Figure 6:
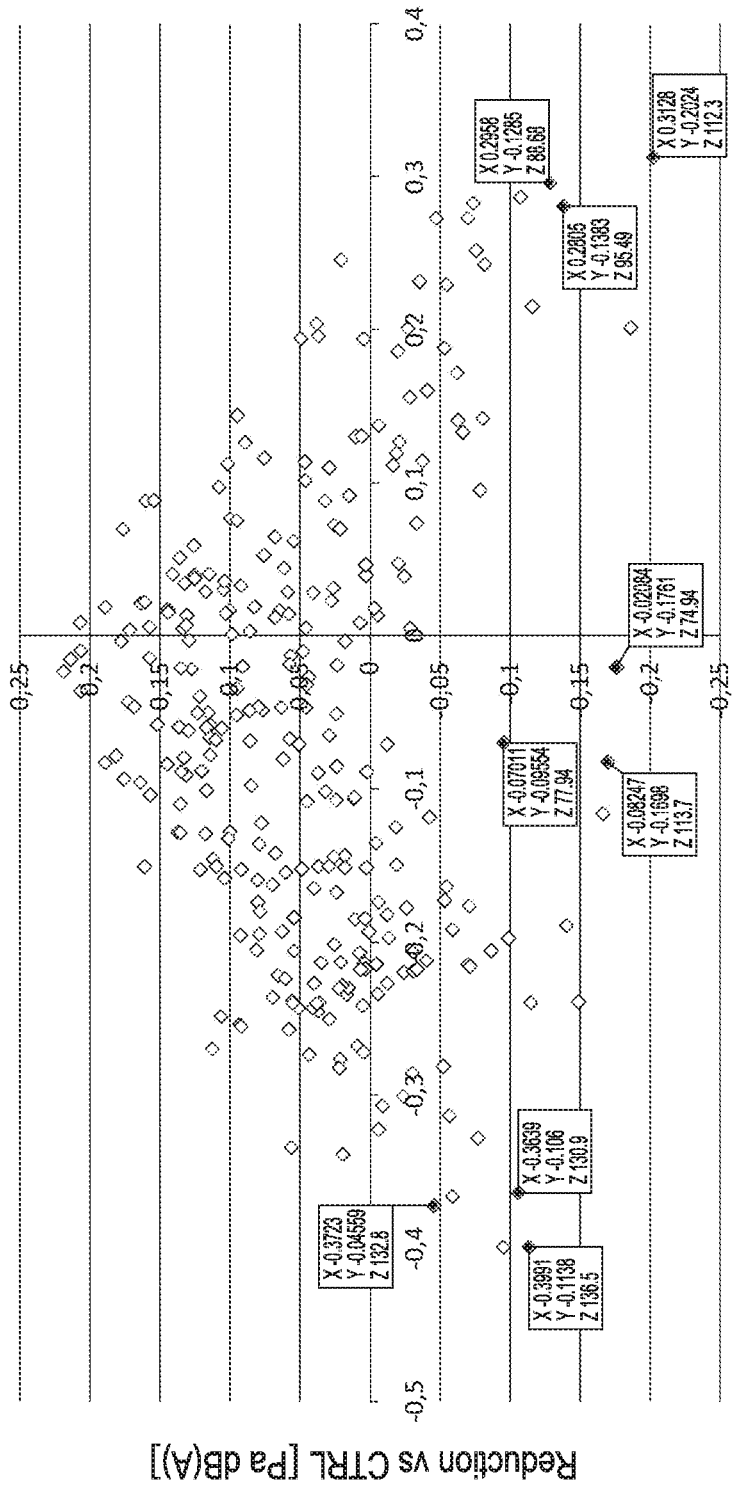
FIG. 6 is a graph of overall noise reduction vs rotation for tires with four out of four circumferential grooves with fences.

FIG. 6, similarly to FIG. 3, is a graph of the results of simulations with the configuration shown in FIG. 5 but with the height and width of the fences varied. The fence densities were not varied. In this case, in contrast to FIG. 3, not all data points show a negative rotation because the fences are provided on both the vehicle installation inner and outer sides. Again, some data points also show an overall noise increase rather than reduction, with a trend for larger rotations to give larger noise reductions.

In FIG. 6 unlike FIG. 3, the actual values of some data points are shown. The values of "Z" given are the total volumes of the fences in the grooves. These are calculated by multiplying the fence area by the fence density ratio for each groove and summing the results to give the total for all the grooves. The fence density is the number of fences in a certain length of groove, and the fence density ratio is the ratio of the fence density in the groove to the fence density in the groove with the lowest fence density. The fence densities used in calculating the values of "Z" were 4.9, 3.1, 1.9, 1 for grooves 50, 52, 54, 56 (inner side to outer side). These values of 4.9, 3.1, 1.9, 1 are calculated by dividing the number of fences in 100 mm of the groove (39, 25, 15 and 8, respectively) by 8 (which is the fence density in the groove with the lowest fence density).

For example, in the configuration which gave the data point on the far left with X: −0.3991, Y: −0.1138 and Z: 136.5, the fences had the dimensions given in Table 1 below. The table also gives the fence volumes for each groove which are added to give the total volume of the fences in the grooves. All fences are 1 mm thick.

TABLE 1

| Groove of FIG. 5 | 50 | 52 | 54 | 56 |
|---|---|---|---|---|
| Fence Length (mm) | 3.8 | 3.9 | 1.9 | 4.0 |
| Fence Height (mm) | 4.3 | 2.9 | 2 | 3.6 |
| Fence Area (mm$^2$) | 16.3 | 11.3 | 3.8 | 14.4 |
| Fence Density Ratio | 39/8 = 4.9 | 25/8 = 3.1 | 15/8 = 1.9 | 8/8 = 1 |
| Volume of Fences | 79.7 | 35.3 | 7.1 | 14.4 |
| Total Volume of Fences | 136.5 | | | |

The configuration of FIG. 1 was found to be better than that of FIG. 5 in terms of providing a good balance of rotation and water drainage. The water drainage is better because grooves 14 and 16 in FIG. 1 do not have fences (in contrast to grooves 54 and 56 of FIG. 5).

Figure 7:
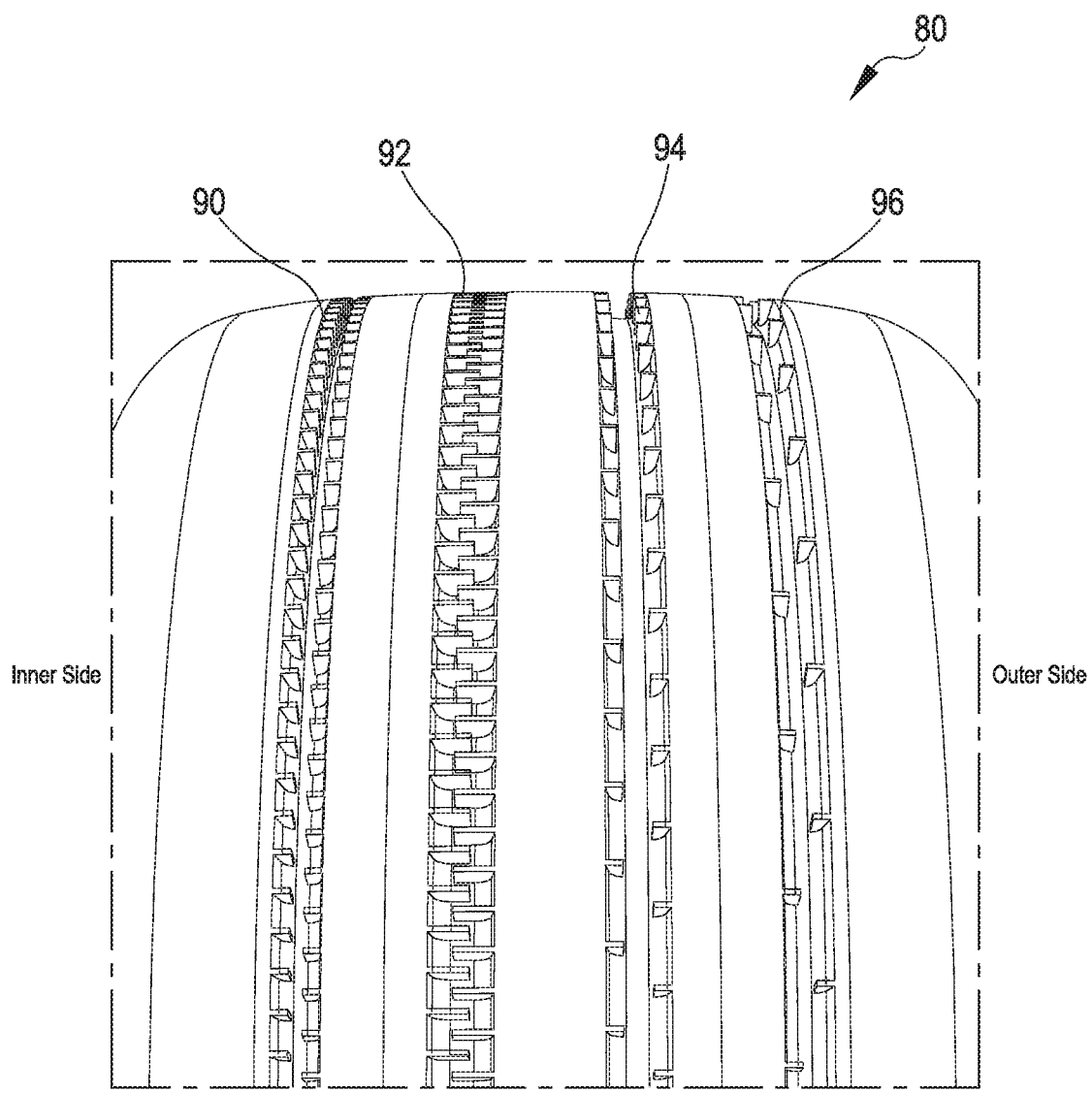
FIG. 7 is an elevation view of a tire along the tire circumferential direction showing four circumferential grooves.

To confirm the effects, experiments were also undertaken on actual tires with fences installed in their circumferential grooves in the tire tread. FIG. 7 shows such a tire 80. The fences are provided on an insert which is inserted into the circumferential groove. Grooves 90 and 92 are on the vehicle installation inner side, and grooves 94 and 96 are on the vehicle installation outer side. All four grooves 90, 92, 94, 96 have fences, with lengths, respectively, of 2.1 mm, 6.0 mm, 3.3 mm and 2.4 mm (left to right in FIG. 7). The heights of the fences 90, 92, 94, 96 are, respectively, 3.8 mm, 3.0 mm, 3.0 mm and 3.8 mm (left to right in FIG. 7).

FIG. 8 shows how the experiment was set up for the tire shown in FIG. 7. The tire was run at 80 kph with a load of 5.14 kN. Microphones 1-5 were placed in an arc around the tire, with "MIC1" being on the outer side, and "MIC5" being on the inner side. The graphs for MIC1 and MIC5 show a larger noise reduction (−2.9 dB) on the outer side than on the inner side (−1.5 dB). The difference of −1.4 dB shows a rotation inwards.

The results of the microphone test were also confirmed using a sound camera map. The visual outputs showed louder sounds on the inner side than the outer side. Also, the special averages were taken of the sound recorded on the inner and outer sides and compared. These showed a good correlation with the microphone test. The spatial averages were then integrated over the range 900-1200 Hz and compared as with the microphone test. The tire was run at 50 kph. The results showed a noise reduction of −4.0 dB on the outer side vs −2.5 dB on the inner side. The difference of −1.5 dB shows a rotation inwards.

Figure 9A:
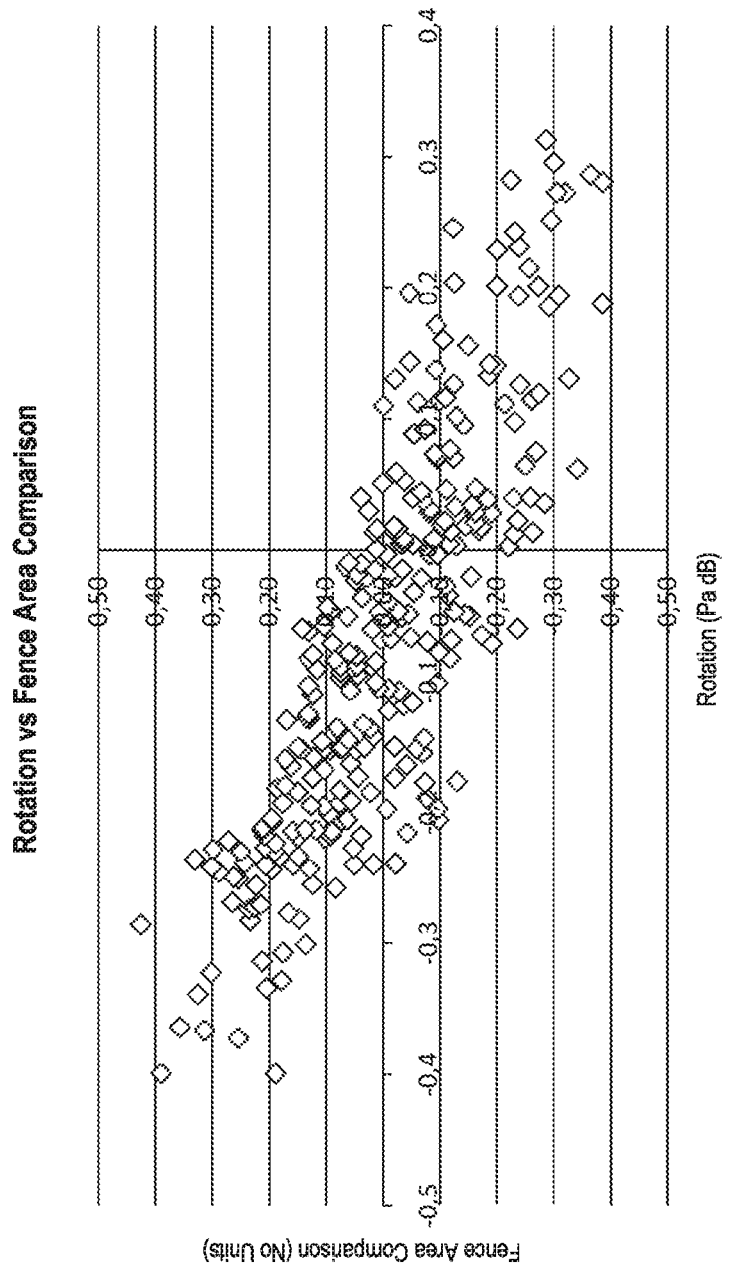
FIGS. 9 to 11 are graphs for tires with four out of four circumferential grooves with fences.

Simulations (referred to as "first simulations" above) were run according to the general configuration shown in FIG. 5 but in which the fence areas were varied while maintaining a constant fence density. The simulations gave data for rotation and overall noise reduction. FIG. 9A is a graph showing the rotation plotted against fence area comparison. The fence area comparison is calculated using the formula:

$$\sum_{k=1}^{n} \frac{Ak}{AGk} - \sum_{l=1}^{m} \frac{Bl}{BGl} = \text{fence area comparison}$$

Table 2 below shows calculations for the same configuration of fences in Table 1. The fence area comparison result of 0.19 and rotation of −0.3991 is shown as one of the data points in FIG. 9A.

TABLE 2

| Groove of FIG. 5 | 50 | 52 | 54 | 56 |
|---|---|---|---|---|
| Fence Length (mm) | 3.8 | 3.9 | 1.9 | 4.0 |
| Fence Height (mm) | 4.3 | 2.9 | 2 | 3.6 |
| Fence Area (mm$^2$) | 16.3 | 11.3 | 3.8 | 14.4 |
| Groove Area (mm$^2$) | 50 | 50 | 50 | 50 |
| Fence Area/Groove Area (Ak/AGk) | 0.33 | 0.23 | 0.08 | 0.29 |
| Fence Area Comparison | (0.33 + 0.23) − (0.08 + 0.29) = 0.19 | | | |

From FIG. 9A, the correlation between the fence area comparison result and the rotation inwards is clear, where, as the fence area comparison result increases, so does the rotation inwards.

Figure 9B:
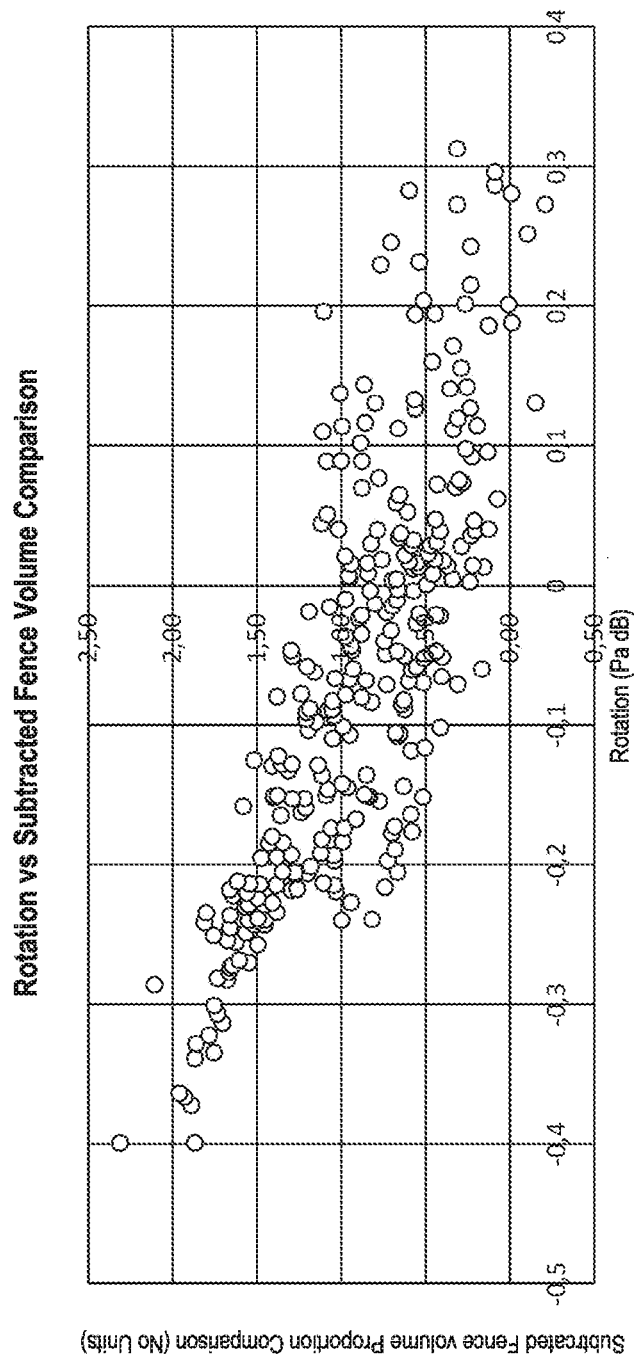

FIG. 9B is a graph of rotation against subtracted fence volume proportion comparison for the same simulations as FIG. 9A. The subtracted fence volume proportion comparison is calculated using the formula:

$$\sum_{k=1}^{n} Ek \frac{Ak}{AGk} - \sum_{l=1}^{m} Fl \frac{Bl}{BGl} =$$

subtracted fence volume proportion comparison where:
Ek and Fl is the protrusion density ratio, the protrusion density being the number of protrusions in a certain length of groove, and the protrusion density ratio being the ratio of the protrusion density in the groove to the protrusion density in the groove with the lowest protrusion density. For example, if the protrusion density in the groove in question is 40 protrusions per 100 mm and the protrusion density in the groove with the lowest protrusion density is 8 protrusions per 100 mm, the ratio will be 40/8=5. Hence this comparison also takes into account the protrusion density.

It can be seen from FIG. 9B that there is a trend for larger fence volume comparison results to have a more negative (i.e. inward) rotation. The larger the comparison result, the more fence volume on the tire inner side compared to the outer side. All simulations with a comparison result of >1.15 give a rotation inwards.

Figure 10:
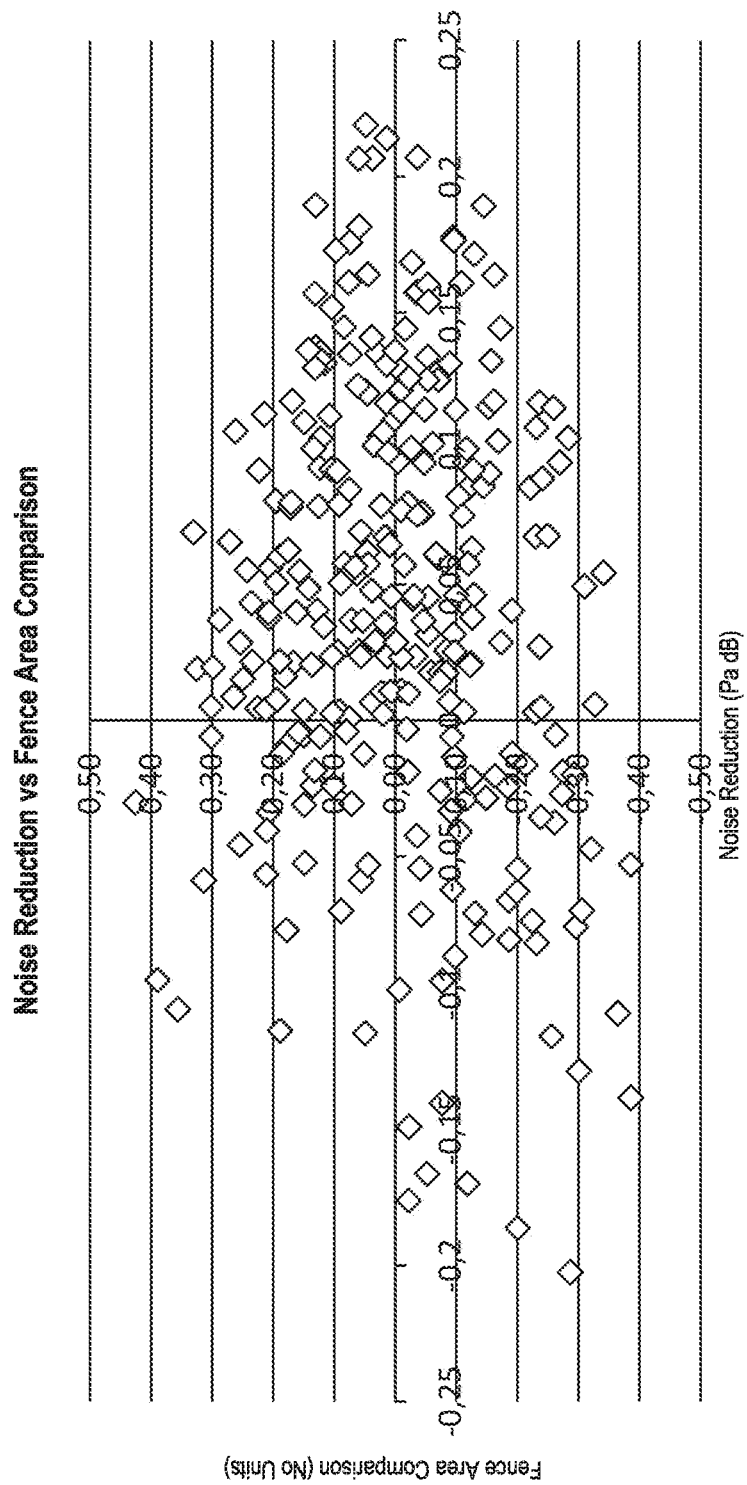

FIG. 10 is a graph of noise reduction against fence area comparison for the same simulations as FIG. 9. The fence area comparison is calculated using the above formula. It can be seen that where the comparison is >0.35, there is an overall noise reduction (the noise reduction becomes negative).

Figure 11:
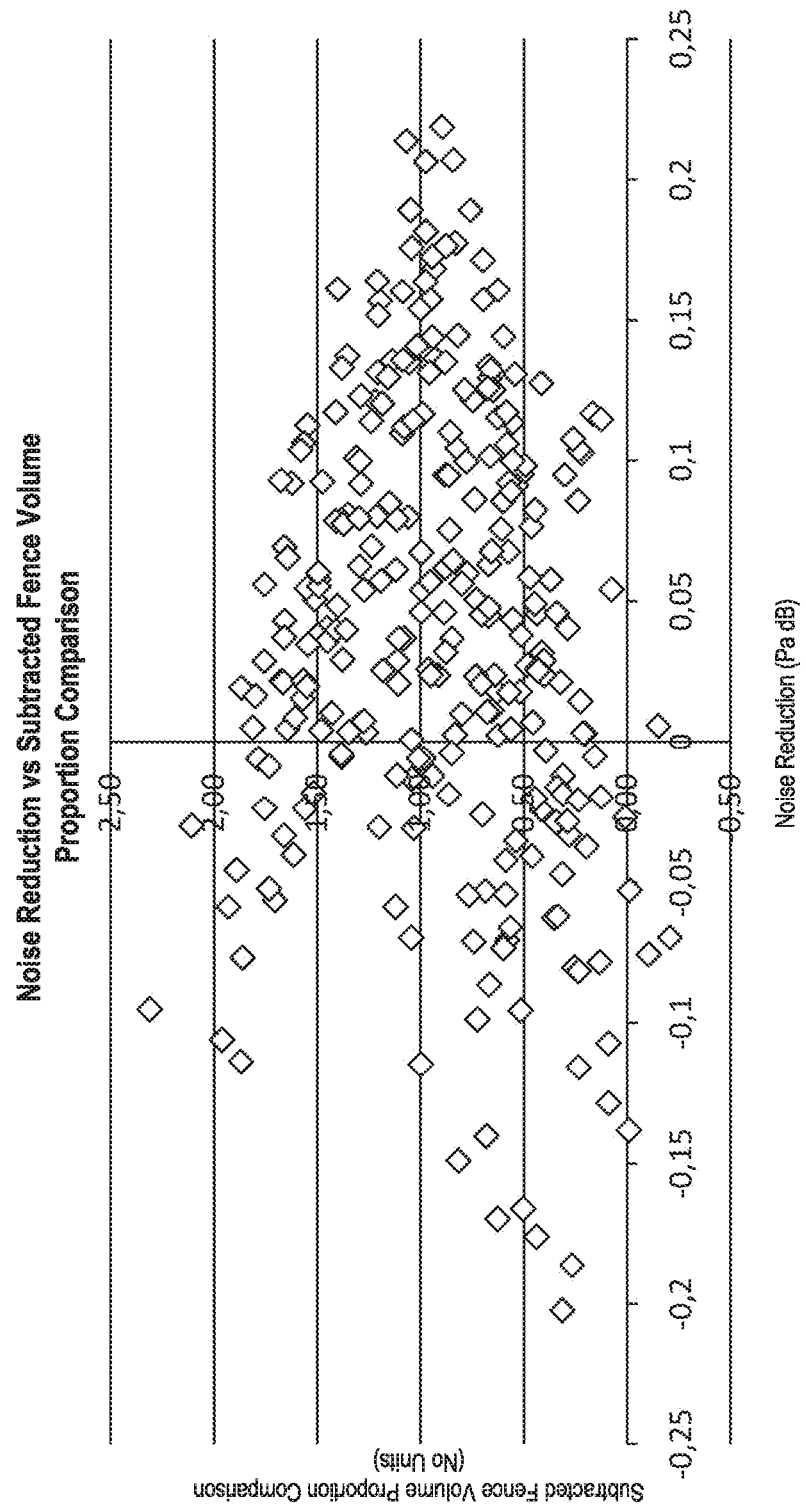

FIG. 11 is a graph of noise reduction against subtracted fence volume proportion comparison for the same simulations as FIG. 9A. The subtracted fence volume proportion comparison is calculated using the formula mentioned above in connection with FIG. 9B.

According to the FIG. 11, there seems to be a trend from low values of the subtracted fence volume comparison result towards values around 1.00, the noise reduction becomes more positive (which is undesirable) but as the values increase from 1.00 there seems to be a trend for more negative noise reduction (which is desirable). It can be seen that above 1.90 for the comparison result, all noise reduction values are negative, that is there is an overall noise reduction.

Simulations (referred to as "second simulations" above) were run for the same general configuration shown in FIG. 5 except that the two grooves next to the midpoint were wider than the other two grooves. Specifically, the groove next to the midpoint were 16.5 mm in width, whereas the other two grooves were 10.2 mm in width. The results are shown in FIG. 12 where similar trends can be seen to those of FIGS. 9-11.

Next, simulations were run for the general configuration shown in FIG. 1 where protrusions are provided only on the inner side. In these simulations, the fence areas were varied while maintaining a constant fence density. The simulations gave data for rotation and overall noise reduction. FIG. 13 shows graphs produced from data from those simulations, and corresponding to the graphs shown in FIGS. 9-12.

Figure 14:
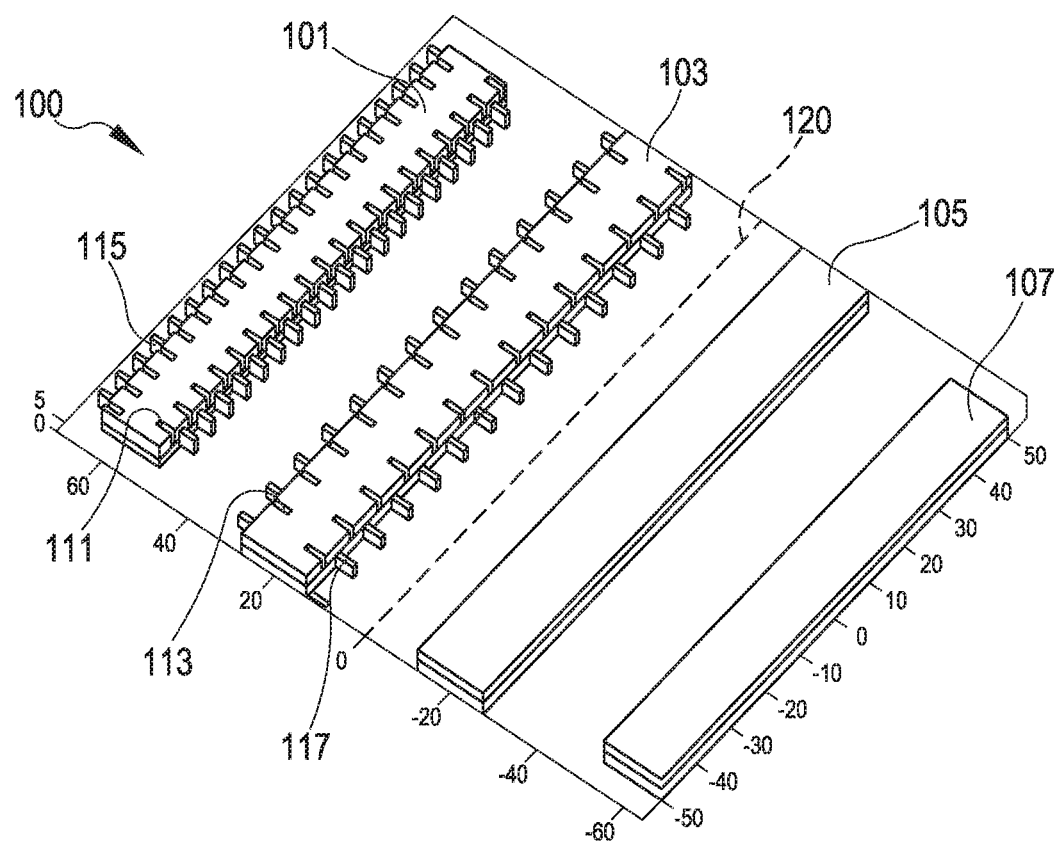
FIG. 14 is a schematic perspective view of four circumferential grooves showing the fence and void distribution of a tire according to a third embodiment.
Figure 15:
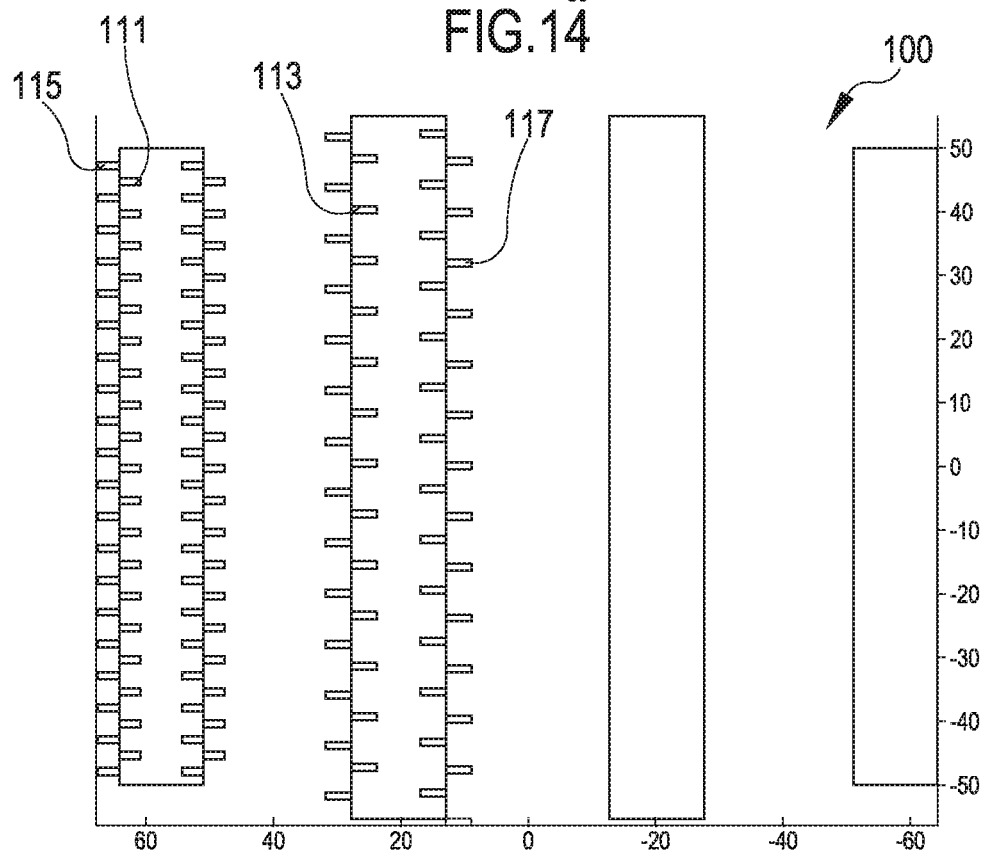
FIG. 15 is a plan view of the embodiment of FIG. 14.

FIGS. 14 and 15 show a configuration of grooves of a tire 100 of a third embodiment. The configuration is similar to that of FIG. 1 and the first embodiment except that the grooves with fences also have recesses in the form of voids. In detail, the grooves 101, 103, 105 and 107 are the same as grooves 10, 12, 14 and 16 of FIG. 1 except that grooves 101 and 103 have fences 111 and 113 and voids 115 and 117. The midpoint is shown by dashed line 120.

Each void 115 is provided in a side wall of the groove 101 opposite to a different protrusion 111, and the same is true for voids 117 and protrusions 113. In this embodiment, each void 115 and 117 (or, more specifically, its centre in the groove longitudinal direction) is provided at the same position in the groove longitudinal direction as its opposite protrusion 111 and 113 (or, more specifically, the protrusion's centre in the groove longitudinal direction). This was found to give the best rotation and overall noise reduction.

Each protrusion 111 has the same dimensions as void 115, and each protrusion 113 has the same dimensions as void 117.

Simulations were run for the general configuration shown in FIGS. 14 and 15 where protrusions and voids are provided only on the inner side. In these simulations, the fence and void areas were varied while maintaining a constant fence density. The simulations gave data for rotation and overall noise reduction. FIG. 16 shows graphs produced from data from those simulations, and corresponding to the graphs shown in FIGS. 9-12. Here, like the FIG. 1 embodiment, the fence density ratios of grooves 101 and 103 are 1.6 and 1, respectively. Also, the recess density ratios of grooves 101 and 103 are 1.6 and 1, respectively.

In all embodiments described, the fence density increases from the vehicle installation outer side towards the inner side, and where there are four grooves with fences, each groove has greater fence density than its outer adjacent groove. However, this is not essential, and the fence density could be the same for each groove, for example.

In addition, each fence extends at a right angle to the groove sidewall, but that is not essential and the fence may extend at smaller angle, for example.

Preferred embodiments of the present disclosure have been described purely by way of example, and various modifications, additions and/or omissions will present themselves to one skilled in the art, all of which form part of the present disclosure, together with their equivalents.

The invention claimed is:

1. A tire having a vehicle installation outer side and a vehicle installation inner side, at least two circumferential grooves, and a midpoint which is halfway between two circumferential grooves which are outermost in the tire width direction,
   at least one of the at least two circumferential grooves, which is on the vehicle installation inner side with respect to the midpoint, having a plurality of protrusions in the groove arranged alternately along the groove next to each side wall of the groove,
   wherein the following inequality is met:

$$\sum_{k=1}^{n} \frac{Ak}{AGk} - \sum_{l=1}^{m} \frac{Bl}{BGl} > 0$$

where:
   k denotes a groove on the vehicle installation inner side with respect to the midpoint;
   n is the number of grooves on the vehicle installation inner side with respect to the midpoint;
   l denotes a groove on the vehicle installation outer side with respect to the midpoint;
   m is the number of grooves on the on the vehicle installation outer side with respect to the midpoint;
   Ak and Bl is the area of the protrusion when the groove is viewed in cross-section perpendicular to the longitudinal direction of the groove; and
   AGk and BGl is the total area of the groove when the groove is viewed in cross-section perpendicular to the longitudinal direction of the groove; and
wherein two of the circumferential grooves, which are on the vehicle installation inner side with respect to the midpoint, each have a plurality of protrusions in the groove arranged alternately along the groove next to each side wall of the groove, and two of the circumferential grooves, which are on the vehicle installation outer side with respect to the midpoint, do not have any protrusions.

2. The tire according to claim 1, wherein the following inequality is met:

$$\sum_{k=1}^{n} \frac{Ak}{AGk} - \sum_{l=1}^{m} \frac{Bl}{BGl} > 0.20.$$

3. The tire according to claim 1, wherein the following inequality is met:

$$\sum_{k=1}^{n} Ek \frac{Ak}{AGk} - \sum_{l=1}^{m} Fl \frac{Bl}{BGl} > 1.20$$

where:
   Ek and Fl is the protrusion density ratio, the protrusion density being the number of protrusions in a certain length of groove, and the protrusion density ratio being the ratio of the protrusion density in the groove to the protrusion density in the groove with the lowest protrusion density.

4. The tire according to claim 1, wherein, for any of the circumferential grooves, which is on the vehicle installation inner side with respect to the midpoint, the following inequality is met:

$$\frac{Ak}{AGk} > 0.2.$$

5. The tire according to claim 1, wherein the at least one of the circumferential grooves which is on the vehicle installation inner side with respect to the midpoint and which has the protrusions is substantially parallel to the tire circumferential direction.

6. A tire having a vehicle installation outer side and a vehicle installation inner side, at least two circumferential grooves, and a midpoint which is halfway between two circumferential grooves which are outermost in the tire width direction, at least one of the circumferential grooves, which is on the vehicle installation inner side with respect to the midpoint, having a plurality of protrusions in the groove arranged alternately along the groove next to each side wall of the groove, and having a plurality of recesses, each recess being provided in a side wall of the groove opposite to a different protrusion, wherein the following inequality is met:

$$\sum_{k=1}^{n} \frac{Ak}{AGk} + \frac{Ck}{CGk} - \sum_{l=1}^{m} \frac{BL}{BGl} + \frac{Dl}{DGl} > 0$$

where:
- k denotes a groove on the vehicle installation inner side with respect to the midpoint;
- n is the number of grooves on the vehicle installation inner side with respect to the midpoint;
- l denotes a groove on the vehicle installation outer side with respect to the midpoint;
- m is the number of grooves on the on the vehicle installation outer side with respect to the midpoint;
- Ak and Bl is the area of the protrusion when the groove is viewed in cross-section perpendicular to the longitudinal direction of the groove;
- AGk and BGl is the total area of the groove when the groove is viewed in cross-section perpendicular to the longitudinal direction of the groove;
- Ck and Dl is the area of the recess when the groove is viewed in cross-section perpendicular to the longitudinal direction of the groove;
- CGk and DGl is the total area of the groove when the groove is viewed in cross-section perpendicular to the longitudinal direction of the groove; and wherein two of the circumferential grooves, which are on the vehicle installation inner side with respect to the midpoint, each have a plurality of protrusions in the groove arranged alternately along the groove next to each side wall of the groove, and a plurality of recesses, each recess being provided in a side wall of the groove opposite to a different protrusion, and two of the circumferential grooves, which are on the vehicle installation outer side with respect to the midpoint, do not have any protrusions or any recesses.

7. The tire according to claim 6, wherein the following inequality is met:

$$\sum_{k=1}^{n} \frac{Ck}{CGk} - \sum_{l=1}^{m} \frac{Dl}{DGl} > 0.$$

8. The tire according to claim 6, wherein the following inequality is met:

$$\sum_{k=1}^{n} \frac{Ak}{AGk} - \sum_{l=1}^{m} \frac{Bl}{BGl} > 0.$$

9. The tire according to claim 6, wherein the following inequality is met:

$$\sum_{k=1}^{n} \frac{Ak}{AGk} + \frac{Ck}{CGk} - \sum_{l=1}^{m} \frac{Bl}{BGl} + \frac{Dl}{DGl} > 0.90.$$

10. The tire according to claim 6, wherein the following inequality is met:

$$\sum_{k=1}^{n} Ek\frac{Ak}{AGk} + Gk\frac{Ck}{CGk} - \sum_{l=1}^{m} Fl\frac{Bl}{BGl} + Hl\frac{Dl}{DGl} > 1.1$$

where:
- Ek and Fl is the protrusion density ratio, the protrusion density being the number of protrusions in a certain length of groove, and the protrusion density ratio being the ratio of the protrusion density in the groove to the protrusion density in the groove with the lowest protrusion density; and
- Gk and Hl is the recess density ratio, the recess density being the number of recesses in a certain length of groove, and the recess density ratio being the ratio of the recess density in the groove to the recess density in the groove with the lowest recess density.

11. The tire according to claim 6, wherein the at least one of the circumferential grooves which is on the vehicle installation inner side with respect to the midpoint and which has the protrusions and recesses is substantially parallel to the tire circumferential direction.

* * * * *